United States Patent [19]

Kimura

[11] Patent Number: 4,740,787

[45] Date of Patent: Apr. 26, 1988

[54] CENTRALIZED MONITORING METHOD FOR SECURITY SYSTEM

[75] Inventor: Tetsuo Kimura, Tokyo, Japan

[73] Assignee: Nittan Company, Limited, Japan

[21] Appl. No.: 779,848

[22] Filed: Sep. 25, 1985

[30] Foreign Application Priority Data

Jan. 25, 1985 [JP] Japan ................................ 60-10793

[51] Int. Cl.$^4$ ........................ G05B 23/02; H04Q 9/00; G08B 29/00

[52] U.S. Cl. ............................ 340/825.08; 340/825.5; 340/825.51; 340/825.12; 340/506; 340/517

[58] Field of Search ................ 340/825.08, 825.5, 628, 340/825.12, 825.51, 825.13, 505, 506, 517, 520, 518; 370/90, 96

[56] References Cited

U.S. PATENT DOCUMENTS

| | | | |
|---|---|---|---|
| 3,323,107 | 5/1967 | Vall | 340/825.13 |
| 3,516,063 | 6/1970 | Arkin et al. | 340/505 |
| 3,755,782 | 8/1973 | Haas et al. | 340/825.08 |
| 3,806,872 | 4/1974 | Odom | 340/825.12 |
| 4,525,700 | 6/1985 | Kimura et al. | 340/505 |
| 4,538,138 | 8/1985 | Harvey et al. | 340/505 |
| 4,546,351 | 10/1985 | Nambu | 340/825.08 |
| 4,586,040 | 4/1986 | Akiba et al. | 340/825.08 |

*Primary Examiner*—Ulysses Weldon
*Assistant Examiner*—Ralph E. Smith
*Attorney, Agent, or Firm*—Stevens, Davis, Miller & Mosher

[57] ABSTRACT

A centralized monitoring method for fire alarm processing, wherein, with respect only to specially designated ones of plural terminal units at least special data common to the special terminal units is transmitted to a central unit with priority over all other data and irrespective of a predesignated calling sequence. The central unit then responds to the special terminal units with absolute priority.

8 Claims, 2 Drawing Sheets

CENTRALIZED MONITORING METHOD FOR SECURITY SYSTEM

BACKGROUND OF THE INVENTION

The invention relates to a centralized monitoring method for a security system in which abnormal conditions such as the occurrence of a fire or gas leakage are detected in a centralized manner.

In the case where a number of terminal units, each having an element such as a fire sensor or a gas leakage detector, are connected to lines which are connected to a central unit thereby to detect the abnormal conditions in the area where the terminal units are installed, a polling system, as disclosed by Japanese Laid-Open patent application No. 103874/1980 has been employed. In this system, addresses are assigned to the terminal units, and the central unit calls the terminal units in sequence using these addresses so that only the terminal units thus called transmit their data, for instance, fire detection signals, to the central unit.

In the above-described polling system, no terminal unit can transmit its data to the central unit until it is called by the central unit. This calling time interval increases with the number of terminal units connected to the lines. Therefore, if the terminal units include ones which must transmit data to the central unit within a predetermined period of time after the formation of the data, then the number of terminal units which can be connected to the lines is limited.

An example of a terminal unit which must transmit data quickly is a transmitter in a fire alarm system. The transmitter displays, when a person who has found a fire operates a push button or the like to inform of the fire to the central unit, a response signal representing the fact that the receiver has received the information. However, in the polling system, it may happen that the button is pushed for a time interval of less than the polling period, that is, the time needed between transmission of the information and the reception of the response signal is longer than the time the push button is held. The person who attempted to report the fire may wonder why there is such a delay and give up in the attempt to report the fire. Thus, this delay time should be decreased.

If transmitters operating as described above are employed in a centralized monitoring method employing a polling system, it is essential to sufficiently take the number of terminal units to be connected to one line into consideration.

SUMMARY OF THE INVENTION

In a centralized monitoring method of the invention, with respect only to particular ones of the plurality of terminal units connected to the lines, at least special data common to the particular terminal units is transmitted to the central unit with priority given to the individual data of the terminal unit, irrespective of the calling sequence of the terminal units, and in response to the arrival of this special data, the central unit calls the particular terminal unit with priority over the other terminal units. Therefore, in the method of the invention, even the above-described transmitters can be connected irrespective of the number of terminal units.

DESCRIPTION OF THE PREFERRED EMBODIMENTS

A centralized monitoring method according to this invention will be described with reference to FIGS. 1, 2 and 3.

Figure 1:
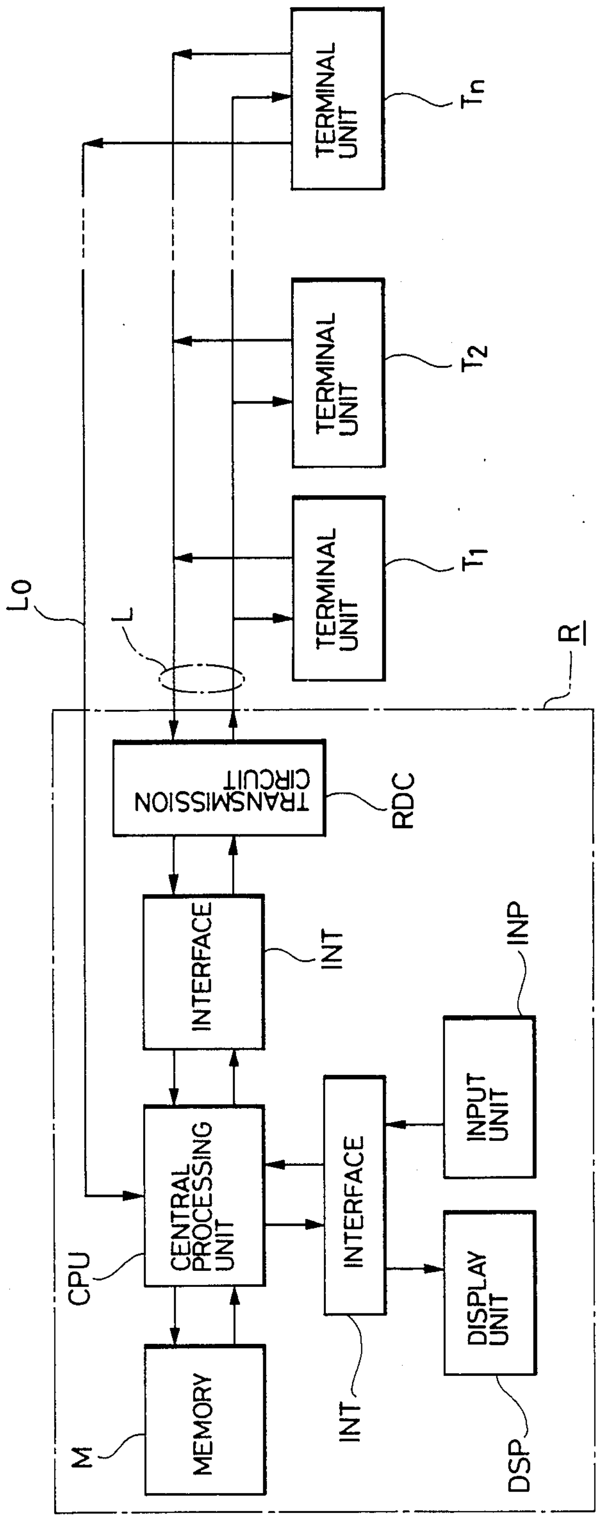
FIG. 1 is a block diagram showing the overall arrangement of a fire alarm system according to a centralized monitoring method of the invention.

FIG. 1 is a block diagram showing a fire alarm system which operates according to the centralized monitoring method of the invention. As shown in FIG. 1, a plurality of terminal units $T_1$ and $T_n$ are connected in parallel to a pair of lines L extending from a central unit R.

Figure 2:
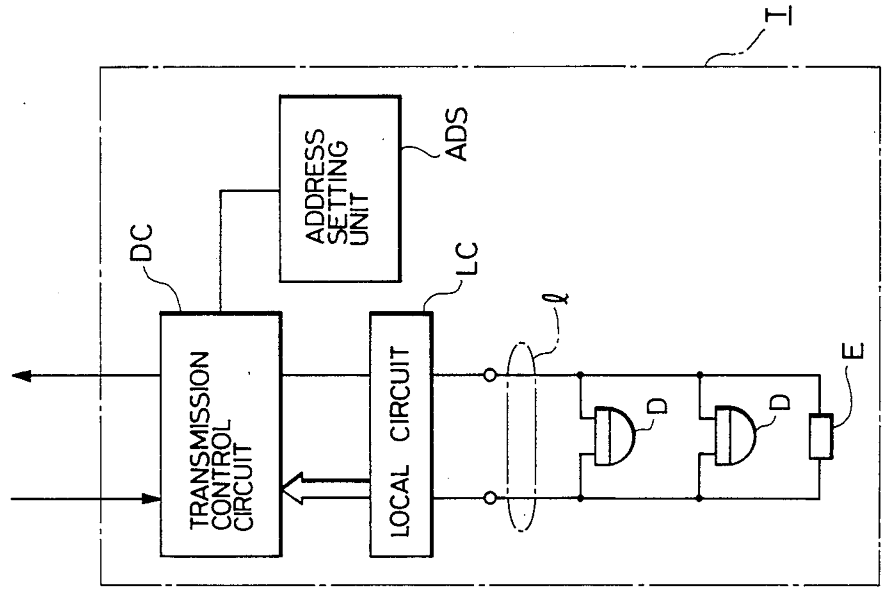
FIG. 2 is a diagram showing one terminal unit in a group of terminal units in FIG. 1.

In this embodiment, as shown in FIG. 2, each of the terminal units includes a plurality of fire sensors D. A local circuit LC detects the operation of each fire sensor D, and detects abnormal conditions of the respective local lines with the aid of an end unit E. In a transmission control circuit DC, an address signal transmitted through the lines L from the central unit R is compared with its own address signal set by an address setting unit ADS. When the two signals coincide with each other, an operation detection signal or abnormal condition detection signal provided by the local circuit LC is applied to the lines L.

Figure 3:
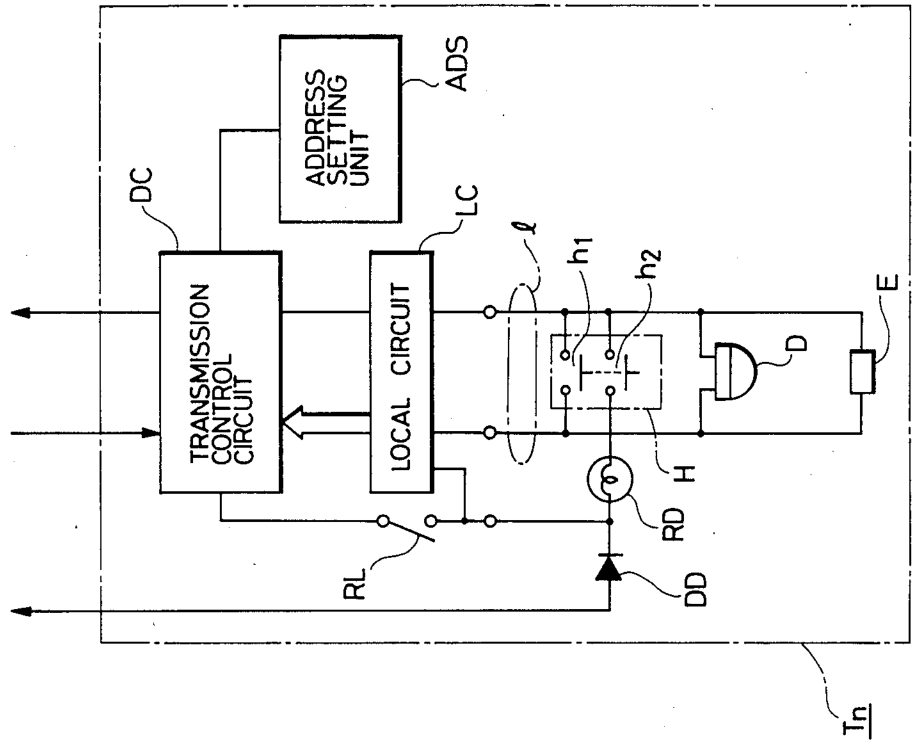
FIG. 3 is a diagram showing one terminal unit in another group of terminal units in FIG. 1.

Some of the terminal units include a transmitter H as shown in FIG. 3. Such a terminal unit $T_n$ is designed so that, when the transmitter is started, a special line $L_0$ is set to a low potential through the operation of a second contact $h_2$ of the transmitter, a response display lamp RD, and a diode DD, thereby to transmit special data to the central unit R which represents the fact that the transmitter H has been started.

In the central unit R, a central processing unit CPU sets the addresses of terminal units to be called in a transmission circuit RDC according to a program stored in memory M, calls the terminal units through the lines L, and receives data from the terminal units (T) through the transmission circuit RDC. The data thus received is processed, and, when desired or necessary, displayed on a display unit DSP. The central processing unit CPU performs various operations in accordance with instructions from an input unit INP, in addition to the above-described operations. However, the detailed descriptioin of these various operations will be omitted because the operations are not directly related to the gist of the invention.

In the above-mentioned embodiment, when the fire alarm system is in a normal condition, the terminals units $T_1$ through $T_n$ are called in sequence by the central unit R according to the operating program, and upon coincidence of addresses, they transmit their data to the central unit R.

In the fire alarm system thus constructed, when the transmitter H in the terminal unit $T_n$ shown in FIG. 3 is started, the first contact $h_1$ thereof is closed so that the local circuit LC generates a transmitter operation signal, while the special line $L_0$ is set to a low potential with the aid of the second contact $h_2$ operating in association with the first contact $h_1$, the response display lamp RD, and the diode DD, so that an interrupt signal is sent to the central processing unit CPU in the central unit R. Thereupon, the central processing unit CPU suspends sequential calling of the terminal units and calls sequentially only the special terminal units which have been programmed in the memory. As the terminal units other than the special terminal units are not called, the terminal unit $T_n$ having the active transmitter is called immediately, and therefore the terminal unit $T_n$ thus called transmits its address signal, and the transmitter operation signal produced by the local circuit LC is applied through the transmission control circuit DC to the central unit R.

In the central unit R, when the terminal unit $T_n$ having the active transmitter is detected, the location of the terminal unit $T_n$ is displayed on the display unit DSP, and a response signal notifying the fact that a transmitter operation signal has been received is delivered through the lines L to the terminal unit $T_n$. As a result, in the terminal unit, a response relay (not shown) in the transmission control circuit DC is driven to cause it to close its normally open contact RL, thereby to energize the response display lamp RD to turn on the latter, while the special line $L_0$ is set to a high potential through the diode DD. Thus, the interrupt signal is eliminated. The central processing unit CPU can now respond to a calling signal from the next special terminal. After accomplishing these special processing operations, the central unit R restarts the ordinary sequential calling operation.

In the above-described embodiment, a special line is used to transmit the special data from the particular terminal unit to the central unit. However, employment of this method results in an increase in the number of lines, and therefore it may be difficult to apply the method to existing fire alarm systems.

However, the special data can be transmitted using only ordinary lines to which all the terminal units are connected (without increasing the number of lines). For this purpose, there are available a variety of methods. In one of the methods, the special data of a special terminal unit when required is provided in a return signal which is transmitted from the terminal units to the central unit, and, whenever the return signal is transmitted to the central unit. the latter detects whether or not the return signal includes the special data. This method has the same effects as in the case where a special line is added as described above.

As is apparent from the above description, in the centralized monitoring method of the invention, with respect only to special ones of the plurality of terminal units, at least the special data common to the special terminal units is transmitted to the central unit before individual data, irrespective of the calling sequence, and in response to the arrival of the special data, the central unit calls the special terminal unit with priority over the other terminal units. Therefore, if transmitters in a fire alarm system which should transmit fire signals quickly are employed as the aforementioned special terminals units, the signals from these terminal units can be processed with priority over those from the other terminal units. Accordingly, in designing a fire preventioin system, it is unnecessary to take the number of terminal units to be connected into account which, in the prior art, must be given consideration over the calling time. That is, the degree of freedom in design is increased. If the centralized monitoring system of the invention is employed without adding the special line, even in an existing system, the signals of the terminal units which should be processed quickly can be processed with priority over those of the other terminal units. That is, the existing system can be improved in performance according to the invention.

I claim:

1. A centralized monitoring method for a security system having a plurality of terminal units connected in parallel to common lines coupled to a central unit, said terminal units transmitting their individual data in a predetermined calling sequence in response to a sequential calling operation carried out through said common lines by said central unit, said central unit detecting abnormal conditions such as fires and gas leakage in response to said individual data, said method comprising the steps of:

providing special ones of said plurality of terminal units with means for generating special priority data having a priority over said individual data of each of said plurality of terminal units and for transmitting said special priority data to said central unit independently of said sequential calling operation, said means for generating special priority data comprising a transmitter including a contact means;

entering addresses of said special ones of said plurality of terminal units into said central unit;

employing said contact means to enable an interrupt signal to be transmitted to said central unit;

employing said contact means to enable a transmitter operation signal to be transmitted to said central unit;

employing said central unit, responsive to receipt of said transmitter operation signal, to suspend said first sequential calling operation and to perform a second sequential calling operation only on said special ones of said plurality of terminal units in order to detect which one of said special ones of said plurality of terminal units transmitted said transmitter operation signal to said central unit; and employing said central unit, responsive to receipt of said interrupt signal and said special priority data from said special one of said special ones of said plurality of terminal units, to transmit a calling signal to said one of said special ones of said plurality of terminal units, said calling signal having priority over all other signals transmitted to or from all others of said plurality of terminal units.

2. The method as in claim 1, wherein said special data is transmitted to said central unit through a special line different from said common lines to which all of said plurality of terminal units are connected, all of said special ones of said plurality of terminal units being connected to said special line.

3. The method as in claim 1, wherein each of said special ones of said plurality of terminal units transmits its special data to said central unit through said common lines to which all of said plurality of terminal units are connected.

4. The method as in claim 1, wherein said transmitter comprises a signal transmitter.

5. A centralized monitoring system, comprising:

a central unit;

common lines connected to said central unit;

a plurality of terminal units connected in parallel to said common lines coupled to said central units, said terminal units each comprising means for transmitting individual data therefrom in accordance with a predetermined calling sequence in response to a first sequential calling operation carried out on all of said plurality of terminal units through said common lines by said central unit, said central unit comprising means for detecting abnormal conditions such as fires and gas leakage in response to said individual data;

special ones of said plurality of terminal units comprising means for generating special priority data having a priority over said individual data of each of said plurality of terminal units and for transmitting said special priority data to said central unit independently of said first sequential calling operation, said means for generating special priority data comprising a transmitter including a contact means enabling a transmitter operation signal to be transmitted to said central unit and an interrupt signal to be transmitted to said central unit;

said central unit comprising means for storing addresses of said special ones of said plurality of terminal units; and said central unit comprising means, responsive to receipt of said transmitter operation signal, for suspending said first sequential calling operation and performing a second sequential calling operation only on said special ones of said plurality of terminal units to detect which one of said special ones of said plurality of terminal units transmitted said transmitter operation signal to said central unit, said central unit further comprising means, responsive to receipt of said interrupt signal and said special priority data from said one of said special ones of said plurality of terminal units, for transmitting a calling signal to said one of said special ones of said plurality of terminal units with priority over all other signals transmitted to or from all others of said plurality of terminal units.

6. A system as in claim 5, further comprising a special line connecting said central unit with all of said special ones of said plurality of terminal units, said special line being a separate line from said common lines to which all of said terminal units are connected.

7. A system as in claim 5, wherein each special terminal transmits its special data to said central unit through said common lines.

8. A system as in claim 5, wherein said transmitter comprises a signal transmitter.

* * * * *